US006638347B2

(12) United States Patent
El-Shoubary et al.

(10) Patent No.: US 6,638,347 B2
(45) Date of Patent: Oct. 28, 2003

(54) CARBON-BASED ADSORPTION POWDER CONTAINING CUPRIC CHLORIDE

(75) Inventors: Youssef El-Shoubary, North Brunswick, NJ (US); Rudy Maes, Easton, PA (US); Subash C. Seth, Watchung, NJ (US)

(73) Assignee: Merck & Co., Inc., Rahway, NJ (US)

( * ) Notice: Subject to any disclaimer, the term of this patent is extended or adjusted under 35 U.S.C. 154(b) by 13 days.

(21) Appl. No.: 09/902,285

(22) Filed: Jul. 10, 2001

(65) Prior Publication Data

US 2002/0035925 A1 Mar. 28, 2002

Related U.S. Application Data

(63) Continuation-in-part of application No. 09/408,361, filed on Sep. 29, 1999, which is a continuation-in-part of application No. 09/590,843, filed on Aug. 9, 2000.

(51) Int. Cl.$^7$ .............................................. B01D 53/04
(52) U.S. Cl. ............................ 96/108; 95/134; 95/141; 95/900; 502/423; 502/437
(58) Field of Search ......................... 95/133, 134, 141, 95/142, 900; 96/108, 132, 135, 136, 154; 423/210; 502/416, 418, 423, 437

(56) References Cited

U.S. PATENT DOCUMENTS

| 1,984,164 | A | * | 12/1934 | Stock ........................ 423/210 |
| 3,193,987 | A | * | 7/1965 | Manes et al. ................ 423/210 |
| 3,194,629 | A | * | 7/1965 | Dreibelbis et al. .......... 423/210 |
| 3,786,619 | A | * | 1/1974 | Melkersson et al. |
| 3,876,393 | A | * | 4/1975 | Kasai et al. |
| 3,956,458 | A | * | 5/1976 | Anderson ................... 423/210 |
| 4,094,777 | A | * | 6/1978 | Sugier et al. |
| 4,273,747 | A | * | 6/1981 | Rasmussen ................. 423/210 |
| 4,889,698 | A | * | 12/1989 | Moller et al. ............. 95/134 X |
| 5,330,560 | A | * | 7/1994 | Chao et al. ............... 95/133 X |
| 5,409,522 | A | * | 4/1995 | Durham et al. |
| 5,456,891 | A | * | 10/1995 | Fattinger et al. ............ 423/210 |
| 5,502,021 | A | * | 3/1996 | Schuster ................. 423/210 X |
| 5,505,766 | A | * | 4/1996 | Chang |
| 5,507,238 | A | * | 4/1996 | Knowles ................. 423/210 X |
| 5,569,436 | A | * | 10/1996 | Lerner ................... 423/210 X |
| 5,575,982 | A | * | 11/1996 | Reiss et al. ................. 423/210 |
| 5,607,496 | A | * | 3/1997 | Brooks |
| 5,659,110 | A | * | 8/1997 | Herden et al. .......... 423/210 X |
| 5,827,352 | A | * | 10/1998 | Altman et al. |
| 6,033,461 | A | * | 3/2000 | Yang et al. ............... 95/900 X |

FOREIGN PATENT DOCUMENTS

| JP | 49-053593 | * | 5/1974 | ................... 95/134 |
| SU | 0480434 | * | 11/1976 | ................... 95/134 |
| SU | 1161157 | * | 6/1985 | ................... 95/134 |
| SU | 1163892 | * | 6/1985 | ................... 95/134 |

* cited by examiner

*Primary Examiner*—Robert H. Spitzer
(74) *Attorney, Agent, or Firm*—James M. Hunter, Jr.; Mark R. Daniel

(57) ABSTRACT

A carbon-based, adsorption powder containing an effective amount of cupric chloride suitable for removing mercury from a high temperature, high moisture gas stream, wherein the effective amount of cupric chloride ranges from about 1 to about 45 wt percent. Additional additives, such as potassium permanganate, calcium hydroxide, potassium iodide and sulfur, may be added to the powder to enhance the removal of mercury from the gas stream.

17 Claims, 2 Drawing Sheets

CARBON-BASED ADSORPTION POWDER CONTAINING CUPRIC CHLORIDE

RELATED APPLICATIONS

This application is a continuation-in-part of application U.S. Ser. No. 09/408,361, filed Sep. 29, 1999, which is a continuation-in-part of U.S. Ser. No. 09/590,845, filed Aug. 9, 2000.

BACKGROUND OF THE INVENTION

The present invention relates to an adsorption powder useful for the removal of metal and organic pollutants from gas streams. The adsorption powder is typically useful for treating solid waste contaminates, e.g. contaminated soil treatment by high efficiency incineration. More particularly, the invention relates to the capture of mercury and other metals, dioxins, furans and other organic compounds from high temperature, high moisture gas streams using an adsorption powder containing cupric chloride.

Strict standards exist for particulate and total mercury emissions by coal-fired power plants, petroleum refineries, chemical refineries, coal fired furnaces, trash burning facilities, incinerators, metallurgical operations, thermal treatment units and other particulate and mercury emitting facilities. These same restrictions apply to mercury vapor, which can enter the atmosphere as a result of low temperature thermal desorption (LTTD) treatment of contaminated soils.

These stringent standards exist in order to protect the environment and the community. When mercury-containing gases are released, the gases disperse and mercury is deposited over a wide area. The dispersed mercury can accumulate in the soil or water supplies, where it may be incorporated into the food chain. Mercury is extremely harmful to aquatic life and ultimately to the humans who consume mercury-contaminated plants and animals. It is necessary, therefore, to have a safe and effective method of eliminating mercury from the environment.

The problem of the capture and treatment of mercury vapor, typically in the context of coal-fired power plants and waste incinerators, has been previously considered. For example, U.S. Pat. No. 3,193,987 discloses passing mercury-containing vapor over activated carbon impregnated with a metal which forms an amalgam with mercury. U.S. Pat. No. 4,094,777 discloses passing a mercury-containing vapor over an adsorption mass consisting essentially of a support, sulfided copper and sulfided silver. U.S. Pat. No. 3,876,393 discloses passing mercury-containing vapors over activated carbon that has been impregnated with sulfuric acid. Selenium has also been used in the removal of mercury from a vapor. U.S. Pat. No. 3,786,619 discloses passing a mercury-containing gas over a mass containing as an active component, selenium, selenium sulfide or other selenium compounds. Electrostatic precipitators and various filters have traditionally been used for mercury removal, although complex apparatus have also been disclosed. (See e.g., U.S. Pat. Nos. 5,409,522 and 5,607,496.)

The problem of recapturing mercury from power plant gas streams is analogous to the need for recapturing mercury from incinerators that treat contaminated soils. A process currently in use at soil treatment facilities is known as low temperature thermal desorption (LTTD). LTTD is the main process by which contaminated soils are treated to remove mercury and other contaminants. In this process, contaminated soils are fed into a heating furnace, most commonly a rotary kiln/drum, where the soil is heated by conduction. The heating volatizes the soil components and when a thermal oxidizer is added, the components are oxidized to manageable gases, such as $CO_2$, $Cl_2$, $NO_X$ and $SO_X$, where x is 1–3.

The hot gas stream is subsequently cooled. The stream may be quenched with water, which cools the stream and concurrently increases the moisture content. Although water quenching is a highly effective cooling method, this treatment increases the difficulty of removing mercury from the gas stream. The gas stream is further treated to reduce and remove metals, HCl, $NO_X$ and $SO_X$ using acid scrubbers, carbon beds, condensation units and through the addition of adsorption powders.

When adsorption powders are injected into the gas stream, mercury and other metals bind to moieties present in the powder, precipitating them from the gas stream. The powder-bound mercury is ultimately collected in a bag house for appropriate disposal, while the clean gas stream is exhausted to the outside atmosphere. The problem with standard LTTD methods is that some metals, such as mercury, are not removed from the stream at high efficiency and will move with the gas stream, ultimately into the environment. Other methods require the use of complex machinery and expensive adsorption beds. LTTD and other methods also suffer from the limitation that mercury removal from high moisture gas streams is much more difficult than mercury removal from dry streams.

Available adsorption powders remove organics, metals and other contaminants, but they do not effectively remove mercury. For example, one available powder (Sorbalite™) consisting of carbon, calcium hydroxide and sulfur removes HCl from a gas stream, but it removed only about 55–65% of the mercury. Another powder (WUELFRAsorb-C™) consisting of alcohol saturated lime and activated carbon is also inefficient at removing mercury.

Some powders include sulfur or iodine impregnated carbon. At temperatures of 75° C. or less, sulfur or iodine impregnated carbon based powders show a 95% mercury removal efficiency, however, powders formulated with sulfur impregnated carbon require that the gas stream to which they are added is dry.

Lastly, the mercury removal efficiency of the powders described and other available powders is known to be very temperature dependent, placing an additional limitation on powder formulations.

Accordingly, there is a need in the industry for an adsorption powder that effectively removes metals and other organic compounds, in general, and mercury, in particular, from high temperature, high moisture gas streams generated by the incineration of contaminated soils, treatment of hazardous materials, combustion of coal and other mercury liberating sources. The powder must be inexpensive and easy to use. Ideally, such an adsorption powder can be employed at treatment facilities already in place and can take advantage of equipment already in position, without requiring retooling or reconfiguring existing equipment.

SUMMARY OF THE INVENTION

There is disclosed an adsorption powder and method for removing mercury, other metals, and contaminants from a gas stream comprising an adsorption powder, wherein the powder is characterized as containing a carbon-based powder selected from the group consisting of coal carbons, wood carbons, graphite carbons, activated carbons, coconut shell carbons, peat carbons, petroleum cokes, synthetic polymers, the like, and combinations thereof, and an effective amount (about 3 to about 10 weight percent) of cupric chloride.

Optionally, sulfur, potassium iodide and permanganate, calcium hydroxide, and combinations thereof may be added to the powder.

BRIEF DESCRIPTION OF THE DRAWINGS

The instant invention will be more fully understood in the following detailed description, however, the invention is not confined to the precise disclosure. Changes and modifications may be made that do not affect the spirit of the invention, nor exceed the scope thereof, as expressed in the appended claims. Accordingly, the instant invention will now be described with particular reference to the accompanying drawings.

DETAILED DESCRIPTION OF THE INVENTION

Figure 1:
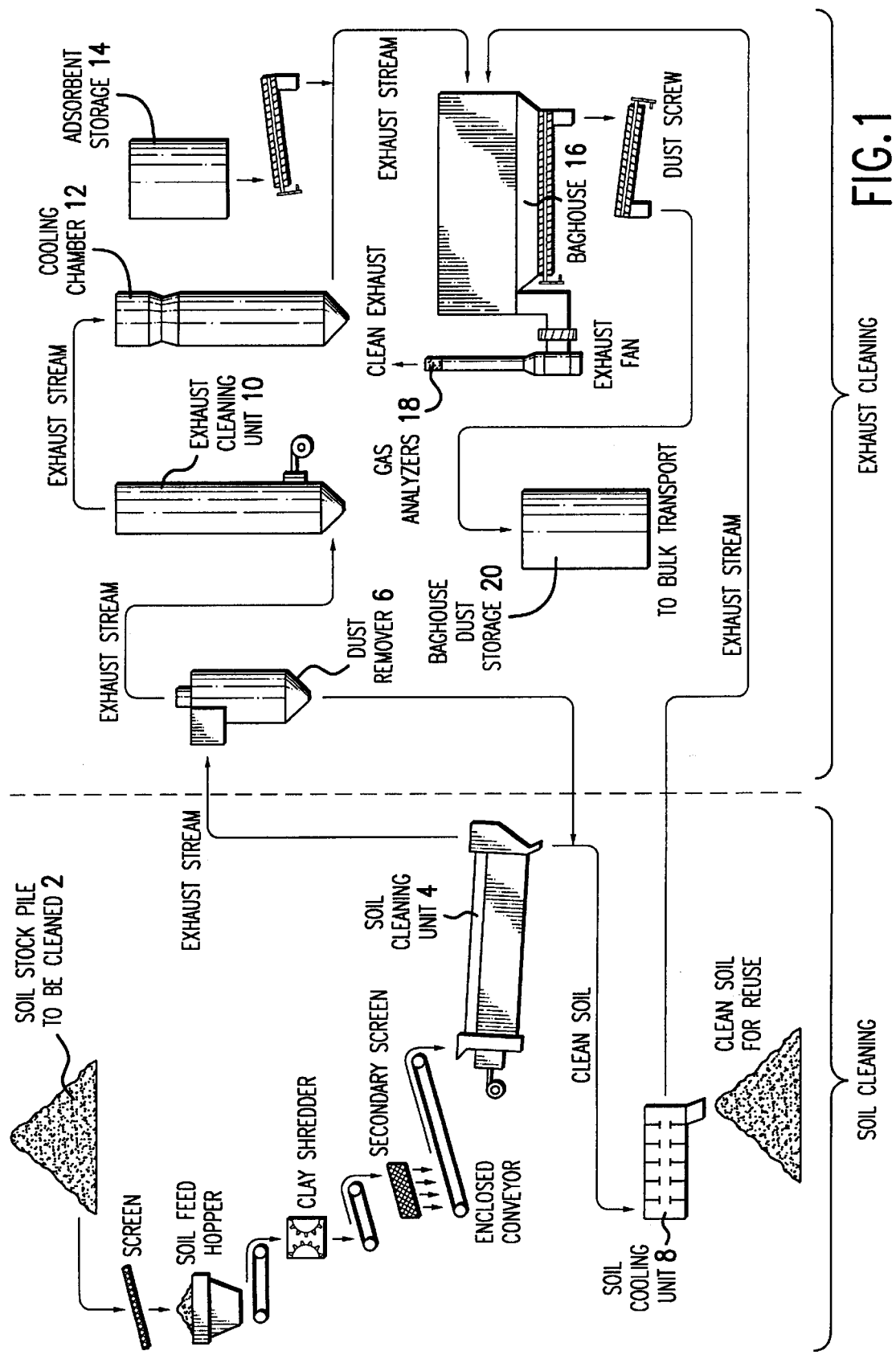
FIG. 1 is a view in elevation of a schematic diagram illustrating the design of an LTTD facility in which the claimed adsorption powder can be used to remove mercury from gas streams.

There is disclosed an adsorption powder suitable for removing metals and organic compounds from high temperature, high moisture gaseous streams, wherein the metals are selected from the group consisting of mercury, lead, nickel, zinc, copper, arsenic, cadmium, other heavy metals, and combinations thereof, wherein the organic compounds selected from the group consisting of furans and dioxins. The powder may be characterized as containing a carbon-based powder and an effective amount of cupric chloride, i.e. from about 90 to about 97 weight percent carbon-based powder and from about 3 to about 10 weight percent of cupric chloride.

It has been found that the addition of cuprous and cupric chlorides to carbon-based powders provides suitable efficiency for removing metals and organic compounds from high temperature, high moisture vaporous streams. While the addition of other ingredients may enhance metal removal efficiency, dependent upon the operating conditions of the removal process, the addition of copper, in various salt forms, to a carbon-based powder will aid the efficiency of metals removal from various gas streams.

Typically, the performance of the carbon-based powder may be further enhanced, dependent upon the process of removal operating conditions, by the addition of calcium hydroxide, sulfur, potassium permanganate, potassium iodide and combinations thereof, and like compounds.

In one embodiment of the invention, the adsorption powder is characterized as containing from 0 to about 62 weight percent of calcium hydroxide, from 0 to about 4 weight percent of sulfur, from 0 to about 15 weight percent of potassium permanganate, from 0 to about 10 weight percent of potassium iodide, from about 3 to about 10 weight percent of cupric chloride, and a balancing weight percent of carbon-based powder to provide 100, total, weight percent of adsorption powder. Within this embodiment is a powder characterized as containing a carbon-based powder, calcium hydroxide, potassium iodide, and cupric chloride, characterized as containing from about 35 to about 38 weight percent of carbon-based powder, from about 52 to about 62 weight percent of calcium hydroxide, from about 5 to about 10 weight percent of potassium iodide, and from about 3 to about 10 weight percent of cupric chloride. While another embodiment is a carbon-based, calcium hydroxide, potassium permanganate, and cupric chloride powder, characterized as containing from about 35 to about 38 weight percent of carbon-based powder, from about 52 to about 62 weight percent of calcium hydroxide, from about 5 to about 10 weight percent of potassium permanganate, and from about 3 to about 10 weight percent of cupric chloride. Still in another variation of this embodiment, the adsorption powder may contain from about 35 to about 38 weight percent of carbon, from about 52 to about 62 weight percent of calcium hydroxide, from 1 to about 4 weight percent of sulfur, from about 5 to about 10 weight percent of potassium permanganate, and from about 3 to about 10 weight percent of cupric chloride.

In yet another embodiment of the invention, the adsorption powder may be characterized as containing from about 35 to about 38 weight percent of carbon, from about 52 to about 62 weight percent of calcium hydroxide, from about 0 to about 4 weight percent of sulfur, and from about 3 to about 10 weight percent of cupric chloride. In still a further embodiment of the invention, the powder is characterized as containing about 38 weight percent of carbon, about 58 weight percent of calcium hydroxide, about 4 weight percent of sulfur, and about 4 weight percent of cupric chloride.

In one embodiment of the invention the potassium permanganate- and potassium iodide-containing powders, optionally, may be impregnated onto a carbon substrate as will become apparent to those skilled in the art. One aspect of this embodiment is a powder characterized as containing from about 35 to about 38 weight percent of coal carbon, from about 52 to about 60 weight percent of calcium hydroxide, from about 5 to about 10 weight percent of potassium iodide impregnated onto a carbon substrate, and from about 5 to about 10 weight percent of cupric chloride. However, the identical potassium iodide component may be in blended with other components to form the adsorption powder.

The invention is also directed to a process for removing mercury and organic compounds from gaseous streams using the adsorption powder described herein, the process being characterized by the steps of:

a) placing a solid phase mercury-containing contaminated soil feed into a rotary kiln/drum;

b) heating said kiln/drum containing said soil feed to form gaseous and solid components of the sample;

c) transferring the gaseous component of said soil feed to an exhaust cleaning unit/afterburner and the solid component of clean soil to a soil cooling unit;

d) heating the gaseous component of said contaminated soil feed in said exhaust cleaning unit/afterburner;

e) cooling the gaseous component of said contaminated soil feed;

f) adding the adsorption powder to the gaseous component;

g) transferring the powder-containing gaseous component to a baghouse; and h) releasing the substantially mercury-free gaseous component of said sample to the atmosphere.

An adsorption powder for the removal of mercury and other metals, dioxins, furans and other organic compounds must be efficient under a range of conditions. Currently available powders do not function well at high temperatures and in high moisture environments, conditions that are favorable to mercury removal.

High temperatures are necessary for effective removal of contaminants from soil. Temperatures of about 1800° F. are necessary to volatize organics, metals and other impurities from the contaminated soil. Mercury that is trapped in contaminated soil, however, is most efficiently adsorbed on carbon at about 300–500° F. The most practical method of cooling a gas stream exiting an 1800° F. oven is to inject water into the gas stream. Water injection cools the gas stream to a temperature favorable to mercury removal, but also increases the moisture content of the sample, which decreases the efficiency of available mercury adsorption powders. The mercury absorbing properties of available powders suffer dramatically in a high moisture environment. The adsorption powder of the invention, however, operates effectively even in a higher moisture environment.

Experiments with carbon sources showed that coal carbon was superior to wood carbon for mercury adsorption. Many available adsorption powders use wood carbon as a component, rather than coal carbon. Cupric chloride was observed to significantly enhance the adsorption of mercury from a gas stream and is the key to the instant invention. Cupric chloride supplies chlorine and activated copper to the elemental mercury in the exhaust stream. Elemental mercury reacts with the chlorine to form mercury chloride and the activated copper to form a stable mercury amalgam. Both forms of mercury are easily captured from the exhaust gas stream. $KI_3$ impregnated carbon was also found to increase mercury adsorption when it was included in the powder.

FIG. 1 shows a schematic diagram of the actual process and equipment used to carry out the invention. Prescreened contaminated feed soil ready to be processed 2 is placed within soil cleaning unit 4. The contaminated soil is heated to about 900° F. or a temperature that will completely volatize the contaminants from the soil and generate a gaseous stream, as well as a clean/remediated solid soil component. Preferably, soil cleaning unit 4 is a rotary kiln. The gas stream is then passed out of soil cleaning unit 4 to dust remover 6, while any solid fraction of the feed soil is transferred to clean soil cooling unit 8, where the soil is cooled and prepared for reuse. Dust remover 6 is preferably a multi-tube dust collector.

After dust remover 6 removes any particulate matter from the gas stream sample, the gas stream is passed into the Exhaust Cleaning Unit 10. The Exhaust Cleaning Unit heats the volatilized contaminates to a temperature of about 1800° F. for a minimum of two seconds retention time, which assures complete destruction of any remaining organic or other contaminants. From the Exhaust Cleaning Unit 10, the gas stream then passes through cooling chamber 12 wherein a water pump (not shown) injects water into the cooling chamber 12 to lower the temperature of the sample to about 360° F. This cooling process consequentially increases the moisture content of the sample.

The high temperature, high moisture gas stream is then contacted to the adsorption powder of the invention, which is stored in adsorbent storage silo 14 and injected into the gas stream. This powder formulation is effective in removing metals, particularly mercury, and other contaminants.

After the gas stream has been contacted to the adsorption powder, the powder/gas stream mixture continues on to baghouse 16. The carbon component of the adsorption powder collects on the walls of bags and acts as a particulate filter for the gases leaving the baghouse. Baghouse 16 collects the particulate mercury-containing fraction of the adsorption powder mixture, which is transported to a suitable bulk storage facility 20 and subsequently removed. The gaseous fraction is released to the outside atmosphere through vent 18, while the remaining dust particulate fraction is handled in a similar manner to the particulate mercury fraction of the adsorption powder mixture 20.

EXAMPLES 1–84

Figure 2:
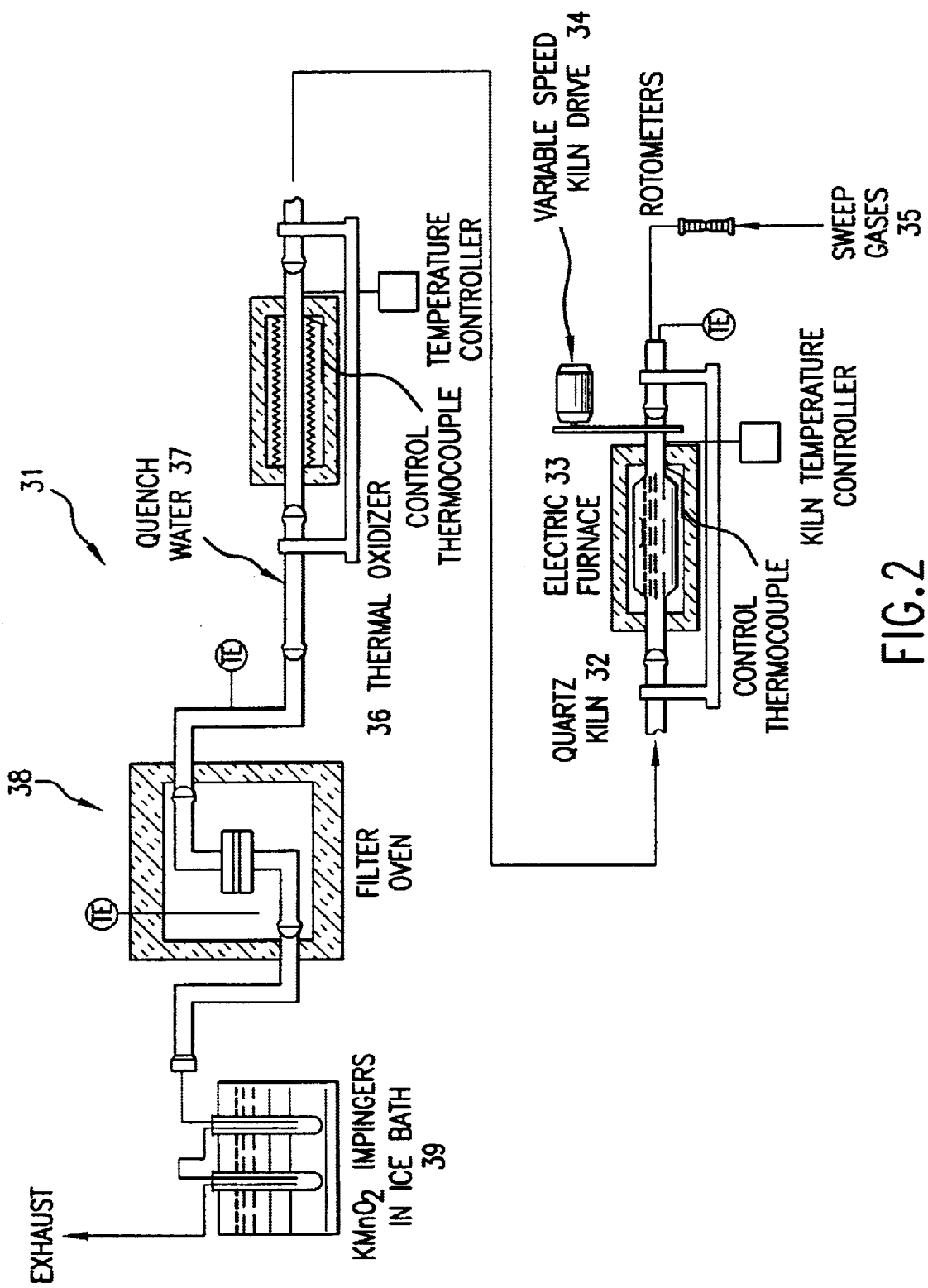
FIG. 2 is a view in elevation of a schematic diagram illustrating the bench scale model of the LTTF facility.

A bench-scale, batch rotary kiln system to simulate the system of FIG. 1 was utilized to conduct and compare various powder mixtures for their capacity to adsorb vaporous mercury from a gaseous stream. A schematic of the system 31 is shown in FIG. 2. A 4-inch diameter quartz rotary kiln 32 was utilized to contain the soil, and an insulated clamshell furnace 33 was utilized to indirectly heat the furnace. The 4-inch diameter section of the kiln was 14-inches in length and contained raised dimples to provide mixing of the soil sample during rotation of the kiln. A variable-speed electric motor 34 and controller rotated the kiln. Purge gas 35 was metered to the kiln with calibrated rotameters from cylinders. Behind the rotary kiln in the process was a thermal oxidizer 36 (another furnace containing a quartz tube). The temperatures within the rotary kiln and thermal oxidizer were maintained with separate controllers. After the thermal oxidizer, quench water 37 was injected into the gaseous stream to lower the temperature of the hot gases. The high moisture, quenched gases were passed through an adsorbent powder filter unit positioned inside a temperature-controlled oven 38, wherein vaporous mercury was efficiently adsorbed by the powder of the invention. The gases were then directed to scrubbing unit 39 that consisted of 2 impingers containing acidic potassium permanganate.

Several soil samples containing known amounts of mercury were screened to at ½-inch to remove rocks and other large particles. The samples were thoroughly blended and divided into approximately 1-kilogram charges. These soil samples were found to contain from about 14 to about 16 ppm of mercury. Several kilogram samples of Magnus soil, containing from about 0.1 to 0.4 ppm of mercury were mixed with the samples containing from about 14 to about 16 ppm of mercury to create samples containing from about 4 to about 6 ppm of mercury. The final samples were air-dried at less than 120° F. to eliminate the majority of free moisture therein. The air-dried soil aided in providing consistent performance of the batch system.

Adsorbent mixtures were prepared by separately weighing each selected component thereof and blending them together. About 4.0 gms. of adsorbent mixture per about 1 kg. of soil was used in each batch measurement (1 kg of soil, as received basis, or about 0.88 kg of air-dried soil). The adsorbent mixture was then packed into a 1.5-inch diameter tube (Test Nos. 1–28) or, alternatively, loaded into a 102 mm×1.6 mm filter holder (Test Nos. 29–84) and evenly distributed, and the tube or filter holder, respectively, was placed inside the filter oven.

The air-dried soil (about 0.88 kg) was loaded into the quartz kiln, gross and net weights were calculated therefor, and the kiln was positioned within the furnace. A small amount of quartz wool was inserted into the exhaust gas end of the system to filter and trap any dust that might be elutriated from the soil. Behind the filter oven was placed 2 impingers, as final gas scrubbers to capture any mercury vapors that might pass through the adsorbent powder. About 100 mls. of acidic potassium permanganate solution was added to each impinger, they were placed in ice baths, and connected to the filter outlet with ground-glass connections so the gaseous stream would bubble through the solution. Inlet gases were mixed to provide a composition of 10 vol. % oxygen, 3.2 vol. % carbon dioxide, 100 ppm of nitrogen oxide, 10 ppm of sulfur dioxide, and the balance nitrogen. The gases were metered into the kiln after all of the connections were complete and gas flow was initiated to the inlet of the kiln at 4.0 standard liters per minute. The system's units were pre-heated to target temperatures before the gas was directed through the thermal oxidizer, water-quench section, and filter oven. Water addition at the outlet of the thermal oxidizer was at a rate of 0.2 ml/mm for Test Nos. 1 through 27 and 1.5 mls/min for Test Nos. 28 through 84 (about 30 wt percent moisture in the gas stream entering the adsorbent filter).

Unless otherwise specified, the experimental conditions were as follows:

TABLE 1

| Parameter | Value |
|---|---|
| Kiln Charge (dry air), kg | 0.88 |
| Adsorbent Weight, g | 4.0 |
| Water Addition, cm/min | 1.5 |
| Purge Gas Flow, L/min | 4.0 |
| Temperatures, ° C. | |
| Kiln | 480 |
| Thermal Oxidizer | 960 |
| Thermal Oxidizer Outlet | 204 |
| Adsorbent | 204 |

After the target temperatures had been achieved for the gas handling units, kiln rotation (1 rpm) and heating 480° F. (900° C.) were initiated, and water injection downstream of the thermal oxidizer was also initiated. About 30 minutes were required to heat the soil to the required temperature, and about 10 minutes after the soil reached that temperature the experiment was stopped. Throughout the experiments, temperatures and gas flows were monitored and controlled at their desired set points. At the end of each experiment, the treated soil, adsorbent powder, and potassium permanganate solution were recovered and analyzed for total mercury. A material balance and distribution of mercury were calculated based on weights and assay results. Mercury capture presented herein was calculated as the difference between 100 and the percent of recovered mercury reporting to the off-gas impingers.

Tables 2 through 8 present the data obtained from the Test Nos. 1 through 84 utilizing 3 base, adsorbent powder mixtures, as follows:

Powder No. 1: 38% carbon+58% $Ca(OH)_2$+4% sulfur

Powder No. 2: 38% carbon+58% $Ca(OH)_2$+4% sulfur+ 10% $KMnO_4$

Powder No. 3: 38% carbon+62% $Ca(OH)_2$+10% $KMnO_4$

Additional components (in weight percent) added to the powders are listed in the tables. For each test run, the soil sample weight, amount of assay mercury contained therein, and the total amount of mercury in the sample was recorded. "Residue" refers to the amount of sample left in the kiln after the heating process, and mercury capture percent provides the efficiency of mercury removal from the sample. "Hg accountability" is the total amount of mercury calculated by material balance.

TABLE 2

| | Test Number | | | | | | | | |
|---|---|---|---|---|---|---|---|---|---|
| Measurement | 1 | 2A | 2B | 3 | 4 | 5 | 6 | 7 | 8 |
| Soil (air-dried at 120° F.) | Magnus | Magnus | Magnus | Magnus | Magnus | Magnus | Magnus | Magnus | Magnus |
| weight, g | 871.0 | 889.2 | 975.3 | 910.4 | 871.2 | 912.6 | 876.0 | 885.4 | 879.7 |
| assay, ppm | 8 | 8 | 8 | 8 | 8 | 8 | 2.3 | 2.3 | 3.0 |
| Total Hg, mg | 6.968 | 7.114 | 7.802 | 7.283 | 6.970 | 7.301 | 2.015 | 2.036 | 2.639 |
| Residue | | | | | | | | | |
| weight, grams | 856.5 | 873.6 | 961.5 | 895.5 | 858.8 | 894.1 | 860.4 | 870.8 | 865.5 |
| weight loss, % | 1.66 | 1.75 | 1.41 | 1.64 | 1.42 | 2.03 | 1.78 | 1.65 | 1.61 |
| assay, ppm Hg | 0.2 | 0.3 | 0.1 | 0.1 | 0.1 | 0.1 | 0.1 | 0.1 | 0.1 |
| Hg, mg | 0.171 | 0.262 | 0.096 | 0.090 | 0.086 | 0.089 | 0.086 | 0.087 | 0.087 |
| Water addition following afterburner | | | | | | | | | |
| media | water | water | water | water + 5% cascade | water + 1% Polymer 8705 | water + 5% Nash | indirect cooling | water | water |
| volume, cc | 8.0 | 7.5 | 7.5 | 9.9 | 8.0 | 7.0 | 0 | 7.0 | 6.0 |
| rate, cc/min | 0.2 | 0.2 | 0.2 | 0.2 | 0.2 | 0.2 | 0.0 | 0.2 | 0.2 |
| Absorbant | Tube | Tube | Tube | Tube | Tube | Tube | Tube | Tube | Tube |
| Temperature, ° F. | 300 | 300 | 300 | 300 | 300 | 300 | 300 | 300 | 300 |
| Type | Mix 1 | Mix 2 | Mix 3 | Mix 1 | Mix 1 | Mix 1 | Mix 1 | Mix 2 | Mix 2 |
| weight, grams | 4.10 | 4.17 | 3.85 | 3.85 | 3.82 | 3.44 | 3.77 | 3.61 | 3.70 |
| assay, ppm Hg | 620 | 395 | 433 | 161 | 230 | 161 | 148 | 240 | 312 |
| Hg, mg | 2.542 | 1.647 | 1.667 | 0.620 | 0.879 | 0.554 | 0.558 | 0.866 | 1.154 |
| % of recovered Hg | 71.9 | 74.0 | 65.1 | 33.0 | 49.5 | 28.4 | 43.5 | 65.1 | 79.7 |
| Off-gas ($KMnO_4$) | | | | | | | | | |
| volume, liter | 0.520 | 0.520 | 0.520 | 0.525 | 0.510 | 0.515 | 0.510 | 0.510 | see below |
| assay, mg/liter | 1.58 | 0.61 | 1.53 | 2.23 | 1.59 | 2.54 | 1.25 | 0.74 | |
| Hg, mg | 0.822 | 0.317 | 0.796 | 1.171 | 0.811 | 1.308 | 0.638 | 0.377 | 0.207 |
| % of Head | 11.79 | 4.46 | 10.20 | 16.07 | 11.63 | 17.92 | 31.64 | 18.53 | 7.84 |
| % of Recovered | 23.24 | 14.25 | 31.09 | 62.27 | 45.67 | 67.04 | 49.75 | 28.36 | 14.28 |
| Total Hg recovered, mg | 3.535 | 2.226 | 2.559 | 1.880 | 1.775 | 1.951 | 1.282 | 1.331 | 1.448 |
| Mercury Capture, % | 76.76 | 85.75 | 68.91 | 37.73 | 54.33 | 32.96 | 50.25 | 71.64 | 85.72 |
| Hg Accountability, % | 50.7 | 31.3 | 32.8 | 25.8 | 25.5 | 26.7 | 63.6 | 65.4 | 54.9 |

TABLE 2-continued

| | Test Number | | | | | | | |
|---|---|---|---|---|---|---|---|---|
| Measurement | 9 | 10 | 11 | 12 | 13 | 14 | 15 | 16 |
| Soil (air-dried at 120° F.) | Magnus | Magnus | Magnus | Magnus | Magnus | Magnus | Magnus | Magnus |
| weight, g | 882.8 | 877.8 | 878.7 | 880.2 | 870.1 | 879.0 | 878.5 | 877.0 |
| assay, ppm | 2.4 | 2.8 | 2.8 | 2.1 | 14.5 | 2.1 | 2.1 | 2.8 |
| Total Hg, mg | 2.119 | 2.458 | 2.460 | 1.848 | 12.616 | 1.846 | 1.845 | 2.456 |
| Residue | | | | | | | | |
| weight, grams | 867.5 | 863.1 | 863.8 | 863.1 | 854.0 | 863.8 | 865.1 | 859.1 |
| weight loss, % | 1.73 | 1.67 | 1.70 | 1.94 | 1.85 | 1.73 | 1.53 | 2.04 |
| assay, ppm Hg | 0.1 | 0.1 | 0.1 | 0.1 | 0.2 | 0.1 | 0.1 | 0.1 |
| Hg, mg | 0.087 | 0.086 | 0.086 | 0.086 | 0.171 | 0.086 | 0.087 | 0.086 |
| Water addition following afterburner | | | | | | | | |
| media | water | water | water | water | water | water | water + 5% cascade | water |
| volume, cc | 6.2 | 7.0 | 7.0 | 8.0 | 9.0 | 8.5 | 7.2 | 9.0 |
| rate, cc/min | 0.2 | 0.2 | 0.2 | 0.2 | 0.2 | 0.2 | 0.2 | 0.2 |
| Absorbant | Tube | Tube | Tube | Tube | Tube | Tube | Tube | Tube |
| Temperature, ° F. | 300 | 300 | 300 | 300 | 300 | 300 | 300 | 300 |
| Type | Mix 1 | Mix 3 | Mix 1 + 5% $CuCl_2$ | Mix 1 + 15% $KMnO_4$ | Mix 2 | Mix 1 + 5% $CuCl_2$ | Mix 3 | Mix 1 + 10% $CuCl_2$ |
| weight, grams | 3.80 | 3.91 | 3.89 | 3.93 | 3.92 | 3.88 | 3.841 | 3.82 |
| assay, ppm Hg | 237 | 142 | 486 | 381 | 1320 | 244 | 153 | 353 |
| Hg, mg | 0.901 | 0.555 | 1.891 | 1.497 | 5.174 | 0.947 | 0.588 | 1.348 |
| % of recovered Hg | 67.0 | 37.4 | 91.6 | 77.9 | 55.8 | 53.1 | 41.1 | 90.8 |
| Off-gas ($KMnO_4$) | | | | | | | | |
| volume, liter | 0.520 | 0.510 | 0.520 | 0.520 | 0.540 | 0.520 | 0.490 | 0.500 |
| assay, mg/liter | 0.685 | 1.65 | 0.167 | 0.65 | 7.26 | 1.44 | 1.54 | 0.10 |
| Hg, mg | 0.356 | 0.842 | 0.087 | 0.338 | 3.920 | 0.749 | 0.755 | 0.050 |
| % of Head | 16.81 | 34.24 | 3.53 | 18.29 | 31.07 | 40.57 | 40.90 | 2.04 |
| % of Recovered | 26.51 | 56.74 | 4.21 | 17.59 | 42.31 | 42.02 | 52.81 | 3.37 |
| Total Hg recovered, mg | 1.344 | 1.483 | 2.064 | 1.922 | 9.266 | 1.782 | 1.429 | 1.484 |
| Mercury Capture, % | 73.49 | 43.26 | 95.79 | 82.41 | 57.69 | 57.98 | 47.19 | 96.63 |
| Hg Accountability, % | 63.4 | 60.3 | 83.9 | 104.0 | 73.4 | 96.5 | 77.4 | 60.4 |

Mix 1: 38% carbon + 58% $Ca(OH)_2$ + 4% Sulfur

Mix 2: 38% carbon + 58% $Ca(OH)_2$ + 4% Sulfur Plus 10% $KMnO_4$

Mix 3: 38% carbon + 62% $Ca(OH)_2$ plus 10% $KMnO_4$

| | vol | mg/l | mg Hg |
|---|---|---|---|
| Test 8 imp 1 | 0.260 | 0.756 | 0.1966 |
| Test 8 imp 2 | 0.250 | 0.041 | 0.0103 |

TABLE 3

| | Test Number | | | | | | | | | | | |
|---|---|---|---|---|---|---|---|---|---|---|---|---|
| Measurement | 17[1/] | 17[2/] | 18[1/] | 18[2/] | 19[1/] | 19[2/] | 20[1/] | 20[2/] | 21[1/] | 21[2/] | 22[1/] | 22[2/] |
| Soil (air-dried at 120° F.) | Magnus Rec'd 2/1 | | Magnus Rec'd 2/1 | | Magnus Rec'd 2/1 | | Magnus Rec'd 2/1 | | Magnus Rec'd 2/1 | | Magnus Rec'd 2/1 | |
| weight, g | 877.2 | 877.2 | 883.2 | 883.2 | 878.1 | 878.1 | 896.0 | 896.0 | 876.6 | 876.6 | 877.6 | 877.6 |
| assay, ppm | 2.1 | 2.0 | 2.2 | 2.5 | 2.1 | 2.2 | 2.0 | 2.1 | 1.9 | 1.9 | 1.9 | 2.0 |
| Total Hg, mg | 1.842 | 1.754 | 1.943 | 2.208 | 1.844 | 1.932 | 1.792 | 1.882 | 1.666 | 1.666 | 1.667 | 1.755 |
| Residue | | | | | | | | | | | | |
| weight, grams | 861.6 | 861.6 | 868.9 | 868.9 | 862.8 | 862.8 | 878.5 | 878.5 | 861.7 | 861.7 | 860.4 | 860.4 |
| weight loss, % | 1.78 | 1.78 | 1.62 | 1.62 | 1.74 | 1.74 | 1.95 | 1.95 | 1.70 | 1.70 | 1.96 | 1.96 |
| assay, ppm Hg | 0.1 | 0.034 | 0.1 | 0.038 | 0.1 | 0.034 | 0.1 | 0.041 | 0.1 | 0.13 | 0.1 | 0.024 |
| Hg, mg | 0.086 | 0.029 | 0.087 | 0.033 | 0.086 | 0.029 | 0.088 | 0.036 | 0.086 | 0.112 | 0.086 | 0.021 |
| Water addition following afterburner | | | | | | | | | | | | |
| media | | water | | water | | water | | water | | water | | water |
| volume, cc | 8.0 | 8.0 | 8.2 | 8.2 | 8.8 | 8.8 | 8.5 | 8.5 | 7.2 | 7.2 | 7.8 | 7.8 |
| rate, cc/min | 0.2 | 0.2 | 0.2 | 0.2 | 0.2 | 0.2 | 0.2 | 0.2 | 0.2 | 0.2 | 0.2 | 0.2 |
| Absorbant | | Filter | | Filter | | Filter | | Filter | | Filter | | Filter |
| Temperature, ° F. | | 300 | | 300 | | 400 | | 300 | | 300 | | 400 |
| Type | Mix 1 + 5% $CuCl_2$ | | Mix 1 + 5% $CuCl_2$ | | Mix 1 + 5% $CuCl_2$ | | Mix 1 + 10% $KMnO_4$ | | Mix 1 + 10% $KMnO_4$ | | Mix 1 + 10% $KMnO_4$ | |
| weight, grams | 4.0 | 4.0 | 4.0 | 4.0 | 3.96 | 3.96 | 3.99 | 3.99 | 4.03 | 4.03 | 3.97 | 3.97 |
| assay, ppm Hg | 415 | 360 | 464 | 290 | 420 | 130 | 385 | 210 | 416 | 220 | 394 | 200 |
| Hg, mg | 1.660 | 1.440 | 1.856 | 1.160 | 1.663 | 0.515 | 1.536 | 0.838 | 1.676 | 0.887 | 1.564 | 0.794 |
| % of recovered Hg | 94.3 | 97.4 | 92.8 | 92.7 | 92.1 | 85.2 | 90.3 | 86.0 | 92.5 | 84.1 | 87.7 | 83.4 |

TABLE 3-continued

| | Test Number | | | | | | | | | | | |
|---|---|---|---|---|---|---|---|---|---|---|---|---|
| Measurement | 17[1/] | 17[2/] | 18[1/] | 18[2/] | 19[1/] | 19[2/] | 20[1/] | 20[2/] | 21[1/] | 21[2/] | 22[1/] | 22[2/] |
| Off-gas (KMnO$_4$) | | | | | | | | | | | | |
| volume, liter | 0.540 | 0.540 | 0.535 | 0.535 | 0.545 | 0.545 | 0.560 | 0.560 | 0.555 | 0.555 | 0.550 | 0.550 |
| assay, mg/liter | 0.025 | 0.017 | 0.108 | 0.110 | 0.105 | 0.11 | 0.137 | 0.18 | 0.089 | 0.10 | 0.242 | 0.25 |
| Hg, mg | 0.0135 | 0.0092 | 0.0578 | 0.0589 | 0.0572 | 0.0600 | 0.0767 | 0.1008 | 0.0494 | 0.0555 | 0.1331 | 0.1375 |
| % of Head | 0.73 | 0.52 | 2.97 | 2.67 | 3.10 | 3.10 | 4.28 | 5.36 | 2.97 | 3.33 | 7.98 | 7.83 |
| % of Recovered | 0.77 | 0.62 | 2.89 | 4.70 | 3.17 | 9.92 | 4.51 | 10.34 | 2.73 | 5.27 | 7.46 | 14.44 |
| Total Hg recovered, mg | 1.760 | 1.478 | 2.001 | 1.252 | 1.807 | 0.604 | 1.701 | 0.975 | 1.812 | 1.054 | 1.783 | 0.952 |
| Mercury Capture, % | 99.23 | 99.38 | 97.11 | 95.30 | 96.83 | 90.08 | 95.49 | 89.66 | 97.27 | 94.73 | 92.54 | 85.56 |
| Hg Accountability, % | 95.5 | 84.3 | 103.0 | 56.7 | 98.0 | 31.3 | 94.9 | 51.8 | 108.8 | 63.3 | 106.9 | 54.2 |

TABLE 4

| | Test Number | | | | | |
|---|---|---|---|---|---|---|
| Measurement | 23 | 24 | 25 | 26 | 27 | 28 |
| Soil (air-dried at 120° F.) | Magnus, rec'd 2/1 | Magnus, rec'd 2/1 | Magnus, rec'd 2/1 | Magnus, rec'd 2/1 | Magnus, rec'd 2/1 | Magnus, rec'd 2/1 |
| weight, g | 880.0 | 878.4 | 877.7 | 882.7 | 879.2 | 879.4 |
| assay, ppm | 2.4 | 2.7 | 2.0 | 2.0 | 3.1 | 3.1 |
| Total Hg, mg | 2.112 | 2.372 | 1.755 | 1.765 | 2.726 | 2.726 |
| Residue | | | | | | |
| weight, grams | 863.9 | 860.9 | 861.7 | 865.1 | 862.2 | 863.7 |
| weight loss, % | 1.83 | 1.99 | 1.82 | 1.99 | 1.93 | 1.79 |
| assay, ppm Hg | 0.1 | 0.1 | 0.1 | 0.1 | 0.1 | 0.1 |
| Hg, mg | 0.086 | 0.086 | 0.086 | 0.087 | 0.086 | 0.086 |
| Water addition following afterburner | | | | | | |
| media | water | water | water | water | water | water |
| volume, cc | 8.5 | 8.0 | 8.0 | 8.2 | 8.2 | 8.1 |
| Absorbant (Filter) | | | | | | |
| Temperature, ° F. | 300 | 300 | 400 | 400 | 300 | 400 |
| Type | Mix 1 | Mix 1 + 5% CuCl$_2$ + 5% KMnO$_4$ | Mix 1 | Powder w/o sulfur + 5% CuCl$_2$ | Repeat 23 Mix 1 | Repeat 25 Mix 1 |
| weight, grams | 3.98 | 3.99 | 3.98 | 3.99 | 4.00 | 4.00 |
| assay, ppm Hg | 435 | 510 | 363 | 440 | 560 | 426 |
| Hg, mg | 1.731 | 2.035 | 1.445 | 1.756 | 2.240 | 1.704 |
| % of recovered Hg | 91.4 | 95.1 | 81.0 | 92.2 | 92.1 | 77.5 |
| Off-gas (KMnO$_4$) | | | | | | |
| volume, liter | 0.530 | 0.550 | 0.550 | 0.540 | 0.550 | 0.545 |
| assay, mg/liter | 0.145 | 0.036 | 0.460 | 0.113 | 0.193 | 0.748 |
| Hg, mg | 0.077 | 0.020 | 0.253 | 0.061 | 0.106 | 0.408 |
| % of Head | 3.64 | 0.83 | 14.41 | 3.46 | 3.89 | 14.95 |
| % of Recovered | 4.06 | 0.92 | 14.18 | 3.21 | 4.36 | 18.55 |
| Total Hg recovered, mg | 1.895 | 2.141 | 1.784 | 1.903 | 2.432 | 2.198 |
| Mercury Capture, % | 95.94 | 99.08 | 85.82 | 96.79 | 95.64 | 81.45 |
| Hg Accountability, % | 89.7 | 90.3 | 101.6 | 107.8 | 89.2 | 80.6 |

| | Test Number | | | | | |
|---|---|---|---|---|---|---|
| Measurement | 29 | 30 | 31 | 32 | 33 | 34 |
| Soil (air-dried at 120° F.) | Magnus, rec'd 2/1 | Magnus, rec'd 2/1 | Magnus, rec'd 2/1 | Magnus, rec'd 2/1 | Magnus, rec'd 2/1 | Magnus, rec'd 2/1 |
| weight, g | 874.9 | 877.0 | 872.2 | 882.9 | 878.4 | 878.9 |
| assay, ppm | 3.1 | 2.9 | 2.2 | 2.9 | 3.0 | 2.9 |
| Total Hg, mg | 2.712 | 2.543 | 1.919 | 2.560 | 2.635 | 2.549 |
| Residue | | | | | | |
| weight, grams | 855.9 | 858.8 | 854.1 | 866.5 | 862.4 | 862.6 |
| weight loss, % | 2.17 | 2.08 | 2.08 | 1.86 | 1.82 | 1.85 |
| assay, ppm Hg | 0.1 | 0.1 | 0.1 | 0.1 | 0.1 | 0.1 |
| Hg, mg | 0.086 | 0.086 | 0.085 | 0.087 | 0.086 | 0.086 |
| Water addition | | | | | | |

TABLE 4-continued

| | | | | | | |
|---|---|---|---|---|---|---|
| following afterburner | | | | | | |
| media | water 1.48 cc/min | water 1.49 cc/min | water 1.47 cc/min | water 1.48 cc/min | water 1.46 cc/min | water 1.49 cc/min |
| volume, cc | 62.0 | 61.0 | 63.0 | 59.0 | 60.0 | 61.0 |
| Absorbant (Filter) | | | | | | |
| Temperature, °F. | 400 | 400 | 400 | 400 | 400 | 400 |
| Type | Mix 1 | Mix 1 + 5% $CuCl_2$ | Mix 1 + 10% $KMnO_4$ | Mix 1 + 5% $CuCl_2$ + 5% $KMnO_4$ | Mix 1 + 10% $CuCl_2$ | Mix 1 + 5% $FeCl_3$ |
| weight, grams | 3.98 | 4.00 | 3.98 | 4.00 | 3.90 | 3.95 |
| assay, ppm Hg | 316 | 522 | 312 | 697 | 579 | 461 |
| Hg, mg | 1.258 | 2.088 | 1.242 | 2.788 | 2.258 | 1.821 |
| % of recovered Hg | 56.2 | 85.9 | 70.3 | 91.0 | 89.3 | 67.1 |
| Off-gas ($KMnO_4$) | | | | | | |
| volume, liter | 0.600 | 0.600 | 0.595 | 0.590 | 0.600 | 0.605 |
| assay, mg/liter | 1.49 | 0.428 | 0.738 | 0.320 | 0.309 | 1.33 |
| Hg, mg | 0.894 | 0.257 | 0.439 | 0.189 | 0.185 | 0.805 |
| % of Head | 32.96 | 10.10 | 22.88 | 7.37 | 7.04 | 31.57 |
| % of Recovered | 39.96 | 10.56 | 24.86 | 6.16 | 7.33 | 29.67 |
| Total Hg recovered, mg | 2.237 | 2.431 | 1.766 | 3.063 | 2.530 | 2.712 |
| Mercury Capture, % | 60.04 | 89.44 | 75.14 | 93.84 | 92.67 | 70.33 |
| Hg Accountability, % | 82.5 | 95.6 | 92.0 | 119.6 | 96.0 | 106.4 |

TABLE 5

| | Test Number | | | | | | | | | |
|---|---|---|---|---|---|---|---|---|---|---|
| Measurement | 35 | 36 | 37 | 38 | 39 | 40[1/] | 41 | 42 | 43 | 44 |
| Soil (air-dried at 120° F.) | Magnus, rec'd 2/1 | Magnus, rec'd 2/1 | Magnus, rec'd 2/1 | Magnus, rec'd 2/1 | Pile 22 High Hg | Magnus, rec'd 2/1 | Magnus, rec'd 2/1 | Magnus, rec'd 2/1 | Magnus, rec'd 2/1 | Pile 22 + Treated |
| weight, g | 880.1 | 881.4 | 880.5 | 877.6 | 880.0 | 868.9 | 881.3 | 876.9 | 877.1 | 875.6 |
| assay, ppm | 2.9 | 2.8 | 2.6 | 3.1 | 16.2 | 6.94 | 2.5 | 1.6 | 2.6 | 4.4 |
| Total Hg, mg | 2.552 | 2.468 | 2.289 | 2.721 | 14.256 | 6.030 | 2.203 | 1.403 | 2.280 | 3.853 |
| Residue | | | | | | | | | | |
| weight, grams | 862.7 | 864.1 | 863.5 | 859.6 | 861.7 | 853.9 | 863.2 | 859.4 | 861.8 | 862.2 |
| weight loss, % | 1.98 | 1.96 | 1.93 | 2.05 | 2.08 | 1.73 | 2.05 | 2.00 | 1.74 | 1.53 |
| assay, ppm Hg | 0.1 | 0.1 | 0.1 | 0.1 | 0.2 | 0.2 | 0.1 | 0.1 | 0.1 | 0.1 |
| Hg, mg | 0.086 | 0.086 | 0.086 | 0.086 | 0.172 | 0.171 | 0.086 | 0.086 | 0.086 | 0.086 |
| Water addition following afterburner | | | | | | | | | | |
| media | water | water | water | water | water | water | water | water | water | water |
| volume, cc | 61 | 61 | 64 | 71 | 71 | 67 | 66 | 64 | 66 | 63 |
| rate, cc/min | 1.49 | 1.45 | 1.49 | 1.45 | 1.48 | 1.49 | 1.50 | 1.49 | 1.50 | 1.50 |
| Absorbant (Filter) | | | | | | | | | | |
| Temperature, °F. | 400 | 400 | 400 | 400 | 400 | 400 | 400 | 400 | 400 | 400 |
| Type | Westates Virgin Coal Carbon | Coal Carbon plus Sulfur | Coal Carbon plus $KI_3$ | Original Powder w/o sulfur + 5% $CuCl_2$ | Original Powder with Sulfur + 5% $CuCl_2$ | Original Powder with Sulfur + 5% $CuCl_2$ | Our powder comp. Using westates coal carbon | Original Powder with Sulfur + 3% $CuCl_2$ | Westates Virgin Coconut Carbon | Coconut Carbon plus Sulfur |
| weight, grams | 3.93 | 3.94 | 3.36 | 4.10 | 3.96 | 3.95 | 4.04 | 3.96 | 3.81 | 3.85 |
| assay, ppm Hg | 502 | 426 | 524 | 462 | 2510 | 1280 | 477 | 592 | 219 | 882 |
| Hg, mg | 1.973 | 1.678 | 1.761 | 1.894 | 9.940 | 5.056 | 1.927 | 2.344 | 0.834 | 3.396 |
| % of recovered Hg | 91.4 | 71.8 | 94.7 | 87.0 | 85.2 | 83.7 | 71.5 | 76.1 | 33.6 | 65.3 |
| Off-gas ($KMnO_4$) | | | | | | | | | | |
| volume, liter | 0.600 | 0.600 | 0.600 | 0.600 | 0.600 | 0.605 | 0.605 | 0.580 | 0.600 | 0.600 |
| assay, mg/liter | 0.167 | 0.953 | 0.020 | 0.330 | 2.590 | 1.35 | 1.13 | 1.12 | 2.61 | 2.87 |
| Hg, mg | 0.100 | 0.572 | 0.012 | 0.198 | 1.554 | 0.817 | 0.684 | 0.650 | 1.566 | 1.722 |
| % of Head | 3.93 | 23.17 | 0.52 | 7.28 | 10.90 | 13.54 | 31.03 | 46.30 | 68.67 | 44.70 |
| % of Recovered | 4.64 | 24.47 | 0.65 | 9.09 | 13.32 | 13.51 | 25.35 | 21.09 | 62.98 | 33.09 |
| Total Hg recovered, mg | 2.159 | 2.337 | 1.859 | 2.178 | 11.666 | 6.044 | 2.697 | 3.080 | 2.487 | 5.204 |
| Mercury Capture, % | 95.36 | 75.53 | 99.35 | 90.91 | 86.68 | 86.49 | 74.65 | 78.91 | 37.02 | 66.91 |

TABLE 5-continued

| | Test Number | | | | | | | | | |
|---|---|---|---|---|---|---|---|---|---|---|
| Measurement | 35 | 36 | 37 | 38 | 39 | 40[1/] | 41 | 42 | 43 | 44 |
| Hg Accountability, % | 84.6 | 94.7 | 81.2 | 80.1 | 81.8 | 100.2 | 122.4 | 219.5 | 109.0 | 135.1 |

[1/]$Hg_2Cl_2$ added to soil.

TABLE 6

| | Test Number | | | | | | |
|---|---|---|---|---|---|---|---|
| Measurement | 45[1/] | 46[1/] | 47[1/] | 48[2/] | 49[2/] | 50 | 51[2/] |
| Soil (air-dried at 120° F.) | Pile 22 + Treated | Magnus, rec'd 2/26 | Magnus, rec'd 2/26 | Magnus, rec'd 2/26 | Magnus, rec'd 2/26 | Pile 22 + Treated | Magnus, rec'd 2/26 |
| weight g | 870.2 | 877.7 | 878.1 | 878.8 | 881.1 | 879.0 | 879.2 |
| assay, ppm | 11.1 | 2.3 | 2.2 | 4.5 | 4.0 | 10.5 | 4.57 |
| Total Hg, mg | 9.659 | 2.019 | 1.888 | 3.955 | 3.524 | 9.230 | 4.018 |
| Residue | | | | | | | |
| weight, grams | 856.7 | 864.5 | 864.5 | 865.8 | 867.7 | 868.0 | 863.1 |
| weight loss, % | 1.55 | 1.50 | 1.55 | 1.48 | 1.52 | 1.25 | 1.83 |
| assay, ppm Hg | 0.2 | 0.1 | 0.1 | 0.1 | 0.3 | 0.1 | 0.1 |
| Hg, mg | 0.171 | 0.086 | 0.086 | 0.087 | 0.260 | 0.087 | 0.086 |
| Water addition following afterburner | | | | | | | |
| media | water | water | water | water | water | water | water |
| volume, cc | 64 | 65 | 62 | 63 | 64 | 61 | 62 |
| rate, cc/min | 1.49 | 1.48 | 1.51 | 1.50 | 1.49 | 1.53 | 1.51 |
| Absorbant (Filter) | | | | | | | |
| Temperature, ° F. | 400 | 400 | 400 | 300 | 400 | Repeat 45 w/o Hg2Cl2 400 | 400 |
| Type | Powder w/o S + 5% $CuCl_2$ | Powder w/o S + 3% $CuCl_2$ | Powder w/o S + 5% $CuCl_2$ | Powder w/o S + 5% $CuCl_2$ | Powder w/o S + 10% $CuCl_2$ | Powder w/o S + 5% $CuCl_2$ | Dravo Wood Carbon |
| weight, grams | 3.97 | 3.96 | 3.95 | 3.94 | 3.89 | 3.96 | 3.73 |
| assay, ppm Hg | 1610 | 416 | 312 | 783 | 623 | 1410 | 269 |
| Hg, mg | 6.392 | 1.647 | 1.232 | 3.086 | 2.421 | 5.584 | 1.003 |
| % of recovered Hg | 83.7 | 80.9 | 78.6 | 80.0 | 85.3 | 66.4 | 24.4 |
| Off-gas ($KMnO_4$) | | | | | | | |
| volume, liter | 0.605 | 0.605 | 0.610 | 0.610 | 0.600 | 0.605 | 0.605 |
| assay, mg/liter | 1.770 | 0.498 | 0.408 | 1.120 | 0.259 | 4.52 | 5.00 |
| Hg, mg | 1.071 | 0.301 | 0.249 | 0.683 | 0.155 | 2.735 | 3.025 |
| % of Head | 11.09 | 14.92 | 13.18 | 17.28 | 4.41 | 29.63 | 75.29 |
| % of Recovered | 14.03 | 14.80 | 15.88 | 17.72 | 5.48 | 32.54 | 73.52 |
| Total Hg recovered, mg | 7.634 | 2.035 | 1.568 | 3.856 | 2.837 | 8.405 | 4.115 |
| Mercury Capture, % | 85.97 | 85.20 | 84.12 | 82.28 | 94.52 | 67.46 | 26.48 |
| Hg Accountability, % | 79.0 | 100.8 | 83.0 | 97.5 | 80.5 | 91.1 | 102.4 |

| | Test Number | | | | | | |
|---|---|---|---|---|---|---|---|
| Measurement | 52[2/] | 53 | 54 | 55 | 56 | 57 | 58 |
| Soil (air-dried at 120° F.) | Magnus, rec'd 2/26 | No Soil; $Hg_2Cl_2$ only | Treated Soil Plus $HgCl_2$ | Treated Soil plus HgS | Treated Soil plus HgO | Treated Soil plus $HgSO_4$ | Treated Soil plus Hg° |
| weight, g | 879.0 | 0.0054 | 879.9 | 880.1 | 879.0 | 879.0 | 879.8 |
| assay, ppm | 4.43 | | 6.2 mg | 4.9 mg | 4.6 mg | 7.1 mg | 4.8 mg |
| Total Hg, mg | 3.894 | 4.60 | 4.58 | 4.22 | 4.26 | 4.80 | 4.80 |
| Residue | | | | | | | |
| weight, grams | 865.8 | 0.0010 | 870.2 | 869.6 | 862.4 | 867.4 | 864.9 |
| weight loss, % | 1.50 | 81.48 | 1.10 | 1.19 | 1.89 | 1.32 | 1.69 |
| assay, ppm Hg | 0.2 | assumed Hg2Cl2 | 0.1 | 0.1 | 0.1 | 0.1 | 0.4 |
| Hg, mg | 0.173 | 0.850 | 0.087 | 0.087 | 0.086 | 0.087 | 0.346 |
| Water addition following afterburner | | | | | | | |
| media | water | water | water | water | water | water | water |

TABLE 6-continued

| | | | | | | | |
|---|---|---|---|---|---|---|---|
| volume, cc | 63 | 44 | 63 | 61 | 61 | 62 | 63 |
| rate, cc/min | 1.50 | 1.52 | 1.50 | 1.53 | 1.49 | 1.48 | 1.51 |
| Absorbant (Filter) | | | | | | | |
| Temperature, °F. | 400 | 400 | 400 | 400 | 400 | 400 | 400 |
| Type | Powder w/o S + 5% CuCl | Powder w/o S + 5% $CuCl_2$ | Powder w/o S + 5% $CuCl_2$ | Powder w/o S + 5% $CuCl_2$ | Powder w/o S + 5% $CuCl_2$ | Powder w/o S + 5% $CuCl_2$ | Powder w/o S + 5% $CuCl_2$ |
| weight, grams | 3.98 | 3.92 | 3.96 | 3.96 | 3.95 | 3.97 | 3.96 |
| assay, ppm Hg | 371 | 470 | 1030 | 663 | 889 | 921 | 973 |
| Hg, mg | 1.478 | 1.843 | 4.079 | 2.625 | 3.515 | 3.654 | 3.851 |
| % of recovered Hg | 46.7 | 64.9 | 82.1 | 80.4 | 84.2 | 85.8 | 83.5 |
| Off-gas ($KMnO_4$) | | | | | | | |
| volume, liter | 0.605 | 0.590 | 0.605 | 0.600 | 0.605 | 0.600 | 0.610 |
| assay, mg/liter | 2.50 | 0.251 | 1.33 | 0.921 | 0.944 | 0.861 | 0.680 |
| Hg, mg | 1.513 | 0.148 | 0.805 | 0.553 | 0.571 | 0.517 | 0.415 |
| % of Head | 38.84 | 3.22 | 17.57 | 13.09 | 13.41 | 10.76 | 8.64 |
| % of Recovered | 47.81 | 5.21 | 16.19 | 16.92 | 13.69 | 12.14 | 8.99 |
| Total Hg recovered, mg | 3.163 | 2.841 | 4.970 | 3.265 | 4.172 | 4.257 | 4.612 |
| Mercury Capture, % | 52.19 | 94.79 | 83.81 | 83.08 | 86.31 | 87.86 | 91.01 |
| Hg Accountability, % | 81.2 | 61.8 | 108.5 | 77.4 | 97.9 | 88.7 | 96.1 |

[1/] - 2 milligrams $Hg_2Cl_2$ added to soil.
[2/] - 4 milligrams $Hg_2Cl_2$ added to soil.

TABLE 7

| | Test Number | | | | | | |
|---|---|---|---|---|---|---|---|
| Measurement | 59 | 60[1/] | 61 | 62 | 63[1/] | 64 | 65 |
| Soil (air-dried at 120° F.) | Magnus 3/3-plus Pile 22 | Magnus rec'd 3/3 | Magnus rec'd 3/3 Plus Hg | Magnus 3/3 plus Pile 22 | Magnus rec'd 3/3 | Magnus 3/3 plus Pile 22 | Magnus 3/3 plus Pile 22 |
| weight, g | 879.6 | 880.9 | 879.9 | 879.7 | 879.7 | 878.8 | 879.2 |
| assay, ppm | 5.3 | na | 5.5 | 5.5 | 5.1 | 4.9 | 4.89 |
| Total Hg, mg | 4.6 | 4.9 | 4.8 | 4.838 | 4.515 | 4.324 | 4.299 |
| Residue | | | | | | | |
| weight, grams | 862.4 | 865.1 | 864.2 | 863.2 | 863.4 | 863.6 | 861.7 |
| weight loss, % | 1.96 | 1.79 | 1.78 | 1.88 | 1.85 | 1.73 | 1.99 |
| assay, ppm Hg | 0.2 | 0.4 | 0.1 | 0.1 | 0.2 | 0.1 | 0.1 |
| Hg, mg | 0.172 | 0.346 | 0.086 | 0.086 | 0.173 | 0.086 | 0.086 |
| Water addition following afterburner | | | | | | | |
| media | water | water | water | water | water | water | water |
| volume, cc | 62 | 63 | 61 | 60 | 60 | 61 | 61 |
| rate, cc/min | 1.51 | 1.50 | 1.49 | 1.50 | 1.46 | 1.49 | 1.45 |
| Absorbant (Filter) | | | | | | | |
| Temperature, °F. | 400 | 400 | 400 | Repeat 29 400 | 400 | 400 | 400 |
| Type | 35% Westates Coal Carbon, 60% $Ca(OH)_2$, 5% $CuCl_2$ | 35% Westates Coal Carbon, 60% $Ca(OH)_2$, 5% $CuCl_2$ | 35% Westates Coal Carbon, 60% $Ca(OH)_2$, 5% $CuCl_2$ | Original Powder with sulfur | 38% Westates Coal Carbon, 52% $Ca(OH)_2$, 10% $CuCl_2$ | 38% Westates Coal Carbon w/ KI3, 62% $Ca(OH)_2$ | Only $CuCl_2$ on Filter, 8.0 g to cover |
| weight, grams | 3.92 | 3.92 | 3.90 | 3.96 | 3.90 | 3.742 | 6.26 |
| assay, ppm Hg | 1020 | 1090 | 853 | 615 | 1050 | 1040 | 10 |
| Hg, mg | 3.998 | 4.275 | 3.327 | 2.435 | 4.095 | 3.892 | 0.063 |
| % of recovered Hg | 90.6 | 82.9 | 71.1 | 55.3 | 93.3 | 96.1 | 1.8 |
| Off-gas ($KMnO_4$) | | | | | | | |
| volume, liter | 0.610 | 0.605 | 0.615 | 0.605 | 0.600 | 0.615 | 0.600 |
| assay, mg/liter | 0.399 | 0.882 | 2.060 | 3.110 | 0.199 | 0.116 | 5.54 |
| Hg, mg | 0.243 | 0.534 | 1.267 | 1.882 | 0.119 | 0.071 | 3.324 |
| % of Head | 5.29 | 10.89 | 26.39 | 38.89 | 2.64 | 1.65 | 77.32 |
| % of Recovered | 5.51 | 10.35 | 27.07 | 42.73 | 2.72 | 1.76 | 95.72 |
| Total Hg recovered, mg | 4.414 | 5.155 | 4.680 | 4.403 | 4.387 | 4.049 | 3.473 |
| Mercury Capture, % | 94.49 | 89.65 | 72.93 | 57.27 | 97.28 | 98.24 | 4.28 |
| Hg Accountability, % | 96.0 | 105.2 | 97.5 | 91.0 | 97.2 | 93.7 | 80.8 |

TABLE 7-continued

| Measurement | Test Number | | | | | |
|---|---|---|---|---|---|---|
| | 66 | 67 | 68 | 69 | 70 | 71 |
| Soil (air-dried at 120° F.) | Magnus 3/3 plus Pile 22 | Magnus 3/3 plus Pile 22 | Magnus 3/3 plus Pile 22 | Magnus 3/3 plus Pile 22 | Magnus rec'd 3/3 Plus Hg | Magnus 3/3 plus Pile 22 |
| weight, g | 880.2 | 881.2 | 880.8 | 880.1 | 879.7 | 881.0 |
| assay, ppm | 5.5 | 5.6 | 4.9 | 5.5 | 6.5 | 6.2 |
| Total Hg, mg | 4.841 | 4.961 | 4.316 | 4.841 | 5.718 | 5.462 |
| Residue | | | | | | |
| weight, grams | 863.7 | 867.1 | 866.1 | 864.9 | 865.5 | 864.4 |
| weight loss, % | 1.87 | 1.60 | 1.67 | 1.73 | 1.61 | 1.88 |
| assay, ppm Hg | 0.2 | 0.1 | 0.1 | 0.2 | 0.1 | 0.1 |
| Hg, mg | 0.173 | 0.087 | 0.087 | 0.173 | 0.087 | 0.086 |
| Water addition following afterburner | | | | | | |
| media | water | water | water | water | water | water |
| volume, cc | 63 | 64 | 62 | 62 | 64 | 66 |
| rate, cc/min | 1.50 | 1.52 | 1.55 | 1.48 | 1.52 | 1.53 |
| Absorbant (Filter) | | | | | | |
| Temperature, ° F. | Repeat 51 w/o Hg2Cl2 400 | 400 | 400 | Repeat 37 400 | Repeat test 61 400 | 400 |
| Type | Dravo Wood Carbon | 38% Westates Coal Carbon Sorbent w/KI3, 52% Ca(OH)$_2$, 10% CuCl$_2$ | Sorbent Tech. Merc Sorbent No. 2 + 62% Ca(OH)$_2$ | Westates Coal Carbon w/KI3 | 35% Westates Coal Carbon, 60% Ca(OH)$_2$, 5% CuCl$_2$ | 38% Westates Coal Carbon, 52% Ca(OH)$_2$, 10% ZnCl$_2$ |
| weight, grams | 3.72 | 3.62 | 4.02 | 3.33 | 3.93 | 3.91 |
| assay, ppm Hg | 687 | 1460 | 956 | 1390 | 1130 | 1050 |
| Hg, mg | 2.556 | 5.285 | 3.843 | 4.633 | 4.444 | 4.109 |
| % of recovered Hg | 51.9 | 97.1 | 93.7 | 96.0 | 74.9 | 62.1 |
| Off-gas (KMnO$_4$) | | | | | | |
| volume, liter | 0.610 | 0.610 | 0.610 | 0.610 | 0.610 | 0.615 |
| assay, mg/liter | 3.60 | 0.116 | 0.282 | 0.033 | 2.30 | 3.94 |
| Hg, mg | 2.196 | 0.071 | 0.172 | 0.020 | 1.403 | 2.423 |
| % of Head | 45.36 | 1.43 | 3.99 | 0.42 | 24.54 | 44.36 |
| % of Recovered | 44.59 | 1.30 | 4.19 | 0.42 | 23.64 | 36.61 |
| Total Hg recovered, mg | 4.924 | 5.443 | 4.102 | 4.826 | 5.934 | 6.618 |
| Mercury Capture, % | 55.41 | 98.70 | 95.81 | 99.58 | 76.36 | 63.39 |
| Hg Accountability, % | 101.7 | 109.7 | 95.0 | 99.7 | 103.8 | 121.2 |

[1]/Hg$_2$Cl$_2$ added

TABLE 8

| Measurement | Test Number | | | | | | |
|---|---|---|---|---|---|---|---|
| | 72 | 73 | 74 | 75 | 76 | 77[1]/ | 78A |
| Soil (air-dried at 120° F.) | Magnus 3/3 plus Pile 22 | Magnus 3/3 plus Pile 22 | Magnus 3/3 plus Pile 22 | Magnus 3/3 plus Pile 22 | Magnus 3/3 plus Pile 22 | Magnus 3/3 with Hg$_2$Cl$_2$ | Magnus 3/3 plus Pile 22 |
| weight, g | 880.2 | 879.9 | 880.3 | 880.8 | 878.9 | 879.4 | 879.1 |
| assay, ppm | 4.6 | 4.9 | 5.7 | 5.7 | 5.3 | 5.1 | 5.6 |
| Total Hg, mg | 4.014 | 4.320 | 5.027 | 4.977 | 4.614 | 4.503 | 4.923 |
| Residue | | | | | | | |
| weight, grams | 864.7 | 863.7 | 864.6 | 868.5 | 864.7 | 865.5 | 864.9 |
| weight loss, % | 1.76 | 1.84 | 1.78 | 1.40 | 1.62 | 1.58 | 1.62 |
| assay, ppm Hg | 0.1 | 0.1 | 0.1 | 0.1 | 0.1 | 0.2 | 0.1 |
| Hg, mg | 0.086 | 0.086 | 0.086 | 0.087 | 0.086 | 0.173 | 0.086 |
| Water addition following afterburner | | | | | | | |
| media | water | water | water | water | water | water | water |
| volume, cc | 67 | 62 | 61 | 65 | 62 | 62 | 65 |
| rate, cc/min | 1.52 | 1.51 | 1.53 | 1.51 | 1.51 | 1.51 | 1.51 |
| Absorbant (Filter) | | | | | | | |
| Temperature, ° F. | 400 | 400 | 400 | 400 | 400 | Repeat | 400 |

TABLE 8-continued

| Type | 35% Westates Coal Carbon, 60% Ca(OH)$_2$, 5% WCC/KI3 | 35% Westates Coal Carbon, 55% Ca(OH)$_2$, 10% WCC/KI3 | 35% Westates Coal Carbon, 55% Ca(OH)$_2$, 5% CuCl$_2$, 5% WCC/KI3 | 38% Westates Coal Carbon, 52% Ca(OH)$_2$, 10% CaCl$_2$ | 38% Norit Coal Carbon PAC-20R, 62% Ca(OH)$_2$ | 63 400 −30 hour Aged Powder Mix | 38% Westates Coal Carbon w/KI$_3$, 62% Ca(OH)$_2$ |
|---|---|---|---|---|---|---|---|
| weight, grams | 3.90 | 3.91 | 3.91 | 3.86 | 3.92 | 3.89 | |
| assay, ppm Hg | 755 | 923 | 1340 | 1060 | 425 | 1050 | |
| Hg, mg | 2.946 | 3.604 | 5.239 | 4.086 | 1.666 | 4.086 | 0.000 |
| % of recovered Hg | 78.9 | 91.7 | 96.3 | 77.2 | 37.1 | 95.0 | 0.0 |
| Off-gas (KMnO$_4$) | | | | | | | |
| volume, liter | 0.610 | 0.610 | 0.605 | 0.610 | 0.610 | 0.615 | 0.615 |
| assay, mg/liter | 1.15 | 0.396 | 0.193 | 1.840 | 4.490 | 0.070 | 0.116 |
| Hg, mg | 0.702 | 0.242 | 0.117 | 1.122 | 2.739 | 0.043 | 0.071 |
| % of Head | 17.48 | 5.59 | 2.32 | 22.55 | 59.36 | 0.96 | 1.45 |
| % of Recovered | 18.79 | 6.14 | 2.15 | 21.20 | 60.98 | 1.00 | na |
| Total Hg recovered, mg | 3.734 | 3.932 | 5.443 | 5.296 | 4.492 | 4.302 | 0.158 |
| Mercury Capture, % | 81.21 | 93.86 | 97.85 | 78.80 | 39.02 | 99.00 | |
| Hg Accountability, % | 93.0 | 91.0 | 108.3 | 106.4 | 97.3 | 95.5 | na |

| | Test Number | | | | | | | |
|---|---|---|---|---|---|---|---|---|
| Measurement | 78B | 79A | 79B | 80 | 81[1/] | 82 | 83 | 84 |
| Soil (air-dried at 120° F.) | Magnus 3/3 plus Pile 22 | Magnus 3/3 plus Pile 22 | Magnus 3/3 plus Pile 22 | Magnus 3/3 plus Pile 22 | Magnus 3/3 with Hg$_2$Cl$_2$ | Magnus 3/3 plus Pile 22 | Magnus 3/3 plus Pile 22 | Magnus 3/3 plus Pile 22 |
| weight, g | 879.8 | 879.9 | 878.8 | 879.4 | 879.0 | 878.8 | 880.0 | 879.9 |
| assay, ppm | 5.7 | 5.5 | 5.3 | 4.9 | 4.1 | 6.3 | 4.9 | 5.0 |
| Total Hg, mg | 5.015 | 4.839 | 4.658 | 4.309 | 3.604 | 5.536 | 4.312 | 4.400 |
| Residue | | | | | | | | |
| weight, grams | 863.8 | 862.7 | 861.5 | 857.1 | 863.1 | 863.3 | 863.1 | 862.8 |
| weight loss, % | 1.82 | 1.95 | 1.97 | 2.54 | 1.81 | 1.76 | 1.92 | 1.94 |
| assay, ppm Hg | 0.1 | 0.1 | 0.1 | 0.1 | 0.1 | 0.1 | 0.1 | 0.1 |
| Hg, mg | 0.086 | 0.086 | 0.086 | 0.086 | 0.086 | 0.086 | 0.086 | 0.086 |
| Water addition following afterburner | | | | | | | | |
| media | water | water | water | water | water | water | water | water |
| volume, cc | 70 | 64 | 63 | 64 | 67 | 65 | 67 | 65 |
| rate, cc/min | 1.52 | 1.49 | 1.50 | 1.49 | 1.49 | 1.51 | 1.52 | 1.54 |
| Absorbant (Filler) | | | | | | | | |
| Temperature, ° F. | 400 | 400 | 400 | Seidler CuCl2 400 | Seidler CuCl2 400 | Seidler CuCl2 400 | Philbro-tech CuCl2 400 | Philbro-tech CuCl2 400 |
| Type | Coal and Reuse Previous Powder | 38% Westates Coal Carbon w/KI$_3$, 52% Ca(OH)$_2$, 10% CuCl$_2$ | Coal and Reuse Previous Powder | 38% Westates Coal Carbon, 52% Ca(OH)$_2$, 10% CuCl$_2$ | 38% Westates Coal Carbon, 52% Ca(OH)$_2$, 10% CuCl$_2$ | 35% Westates Coal Carbon, 50% Ca(OH)$_2$, 5% CuCl$_2$, 10% WCC/KI3 | 38% Westates Coal Carbon, 52% Ca(OH)$_2$, 10% CuCl$_2$ | 35% Westates Coal Carbon, 50% Ca(OH)$_2$, 5% CuCl$_2$, 10% WCC/KI3 |
| weight, grams | 7.60 | | 7.54 | 3.86 | 3.83 | 3.87 | 3.85 | 3.85 |
| assay, ppm Hg | 1670 | | 1280 | 1050 | 827 | 1550 | 1010 | 1050 |
| Hg, mg | 12.692 | 0.000 | 9.645 | 4.053 | 3.167 | 6.002 | 3.889 | 4.043 |
| % of recovered Hg | 98.2 | 0.0 | 98.7 | 95.3 | 96.1 | 95.5 | 94.7 | 93.9 |
| Off-gas (KMnO$_4$) | | | | | | | | |
| volume, liter | 0.620 | 0.625 | 0.620 | 0.610 | 0.605 | 0.615 | 0.615 | 0.615 |
| assay, mg/liter | 0.232 | 0.017 | 0.068 | 0.188 | 0.067 | 0.320 | 0.217 | 0.290 |
| Hg, mg | 0.144 | 0.011 | 0.042 | 0.115 | 0.041 | 0.197 | 0.133 | 0.178 |
| % of Head | 2.87 | 0.22 | 0.91 | 2.66 | 1.12 | 3.55 | 3.09 | 4.05 |
| % of Recovered | 1.11 | na | 0.43 | 2.70 | 1.23 | 3.13 | 3.25 | 4.14 |
| Total Hg recovered, mg | 12.922 | 0.097 | 9.773 | 4.253 | 3.294 | 6.285 | 4.108 | 4.307 |
| Mercury Capture, % | 98.89 | | 99.57 | 97.30 | 98.77 | 96.87 | 96.75 | 95.86 |
| Hg Accountability, % | 130.0 | na | 102.9 | 98.7 | 91.4 | 113.5 | 95.3 | 97.9 |

[1/]Hg$_2$Cl$_2$ added

TABLE 9

| Absorbent Powder Mixture | Vapor Mercury Capture, % | Test Numbers Achieving Capture |
|---|---|---|
| 38% WCC with KI$_3$<br>52% Ca(OH)$_2$<br>10% CuCl$_2$ | 98.7 to 99.5 | 67, 79A, and 79B |
| 38% WCC<br>52% Ca(OH)$_2$<br>10% CuCl$_2$ | 96.7 to 99.0 | 63, 77,<br>80, 81,[1/]<br>and 83[2/] |
| 38% WCC with KI$_3$<br>62% Ca(OH)$_2$ | >98.2 | 64, 78A, and B |
| 35% WCC<br>50% Ca(OH)$_2$<br>5% WCC with KI$_3$<br>10% CuCl$_2$ | 95.9 to 96.9 | 82[1/]<br>84[2/] |
| Original Rahway Powder Mixture | 57.3 and 60.0 | 29 and 62 |

[1/]Seidler Chemical Co. CuCl$_2$
[2/]Phibro-Tech. Inc. CuCl$_2$
WCC = Westates Coal Carbon In accordance with the tables, Test Numbers 29 and 62 utilized a powder without additives (38 wt. % of carbon, 52 wt. % of calcium hydroxide, and 4 wt. % of sulfur), and the mercury capture results were 60 and 57.3%, respectively. The addition of 5% cupric chloride (by weight) of Test Numbers 30, 39 and 40 resulted in mercury capture efficiency ranging from 86.5 to 90.0%. Ten percent cupric chloride added to the kiln charge, Test Number 33, resulted in a mercury capture of 93%. Test Number 32 containing additives of 5% potassium permanganate and 5% cupric chloride resulted in a mercury capture efficiency of 93.8%. Five tests, Test Numbers 54 through 58 were preformed using soil (containing no mercury) spiked with various mercury compounds to achieve approximately 4 to 5 milligrams of mercury in the kiln burden. Spiking compounds included HgCl$_2$, HgS, HgO, HgSO$_4$, and elemental mercury, and the adsorbent powder included a 5% cupric chloride additive. The mercury removal efficiency for these examples ranged from 83 to 91%.

Test Numbers 37 and 69 (repeat examples) achieved mercury capture efficiencies of 99.3 and 99.6%, respectively, utilizing Westates coal carbon impregnated with potassium iodide. Westates coal carbon impregnated with potassium iodide mixtures, as tested in Tests 64 and 67, provided mercury capture efficiencies of 98.3 and 98.7%, respectively. Test Numbers 79A and 79B contained an adsorbent powder characterized as containing 38% Westates coal carbon impregnated with potassium iodide, 52% calcium hydroxide, and 10% cupric chloride, and the mercury capture increased to 99.6% with the addition of cupric chloride the powder.

What is claimed is:

1. An adsorption powder suitable for removing metals and organic compounds from a gaseous stream, wherein the powder comprises a carbon-based powder and an effective amount of cupric chloride to remove metals and organic compounds.

2. The adsorption powder according to claim 1, wherein the carbon-based powder is selected from the group consisting of coal carbons, wood carbons, graphite carbons, activated carbons, coconut shell carbons, peat carbons, petroleum cokes, synthetic polymers, and combinations thereof.

3. The adsorption powder according to claim 2, wherein the effective amount of cupric chloride is from about 3 to about 10 weight percent.

4. The adsorption powder according to claim 3, further comprises a component selected from the group consisting of calcium hydroxide, sulfur, potassium permanganate, potassium iodide and combinations thereof.

5. The adsorption powder according to claim 4, comprising from 0 to about 62 weight percent of calcium hydroxide, from 0 to about 4 weight percent of sulfur, from 0 to about 15 weight percent of potassium permanganate, from 0 to about 10 weight percent of potassium iodide, from about 3 to 10 weight percent of cupric chloride, and a balancing weight percent of the carbon-based powder to provide 100 total weight percent of the adsorption powder.

6. The adsorption powder according to claim 5 comprising from about 35 to 38 weight percent of the carbon-based powder, from about 52 to about 62 weight percent of calcium hydroxide, from about 5 to about 10 weight percent of potassium iodide, and from about 3 to about 10 weight percent of cupric chloride, based on 100 total weight percent of the adsorption powder.

7. The adsorption powder according to claim 5, comprising from about 35 to about 38 weight percent of the carbon-based powder, from about 52 to about 62 weight percent of calcium hydroxide, from about 5 to about 10 weight percent of potassium permanganate, and from about 3 to about 10 weight percent of cupric chloride, based on 100 total weight percent of the adsorption powder.

8. The adsorption powder according to claim 5, comprising from about 35 to about 38 weight percent of the carbon-based powder, from about 52 to about 62 weight percent of calcium hydroxide, from about 1 to about 4 weight percent of sulfur, from about 5 to about 10 weight percent of potassium permanganate, and from about 3 to about 10 weight percent of cupric chloride, based on 100 total weight percent of the adsorption powder.

9. The adsorption powder according to claim 5, comprising from about 35 to about 38 weight percent of the carbon-based powder, from about 52 to about 62 weight percent of calcium hydroxide, from about 1 to about 4 weight percent of sulfur, and from about 3 to about 10 weight percent of cupric chloride, based on 100 total weight percent of the adsorption powder.

10. The adsorption powder according to claim 9, comprising about 38 weight percent of the carbon-based powder, about 58 weight percent of calcium hydroxide, about 4 weight percent of sulfur, and about 4 weight percent of cupric chloride, based on 100 total weight percent of the adsorption powder.

11. The adsorption powder according to claim 4, comprising from about 35 to about 38 weight percent of the carbon-based powder, from about 52 to about 62 weight percent of calcium hydroxide, from about 1 to about 4 weight percent of sulfur, and from about 3 to about 10 weight percent of cupric chloride, based on 100 total weight percent of the adsorption powder.

12. An adsorption powder suitable for removing metals and organic compounds from a gas stream, comprising a carbon-based powder selected from the group consisting of coal carbons, wood carbons, graphite carbons, activated carbons, coconut shell carbons, peat carbons, petroleum cokes, synthetic polymers, and combinations thereof, and from about 3 to about 10 weight percent of cupric chloride.

13. The adsorption powder according to claim 12, wherein the powder further comprises a component selected from the group consisting of calcium hydroxide, sulfur, potassium permanganate, potassium iodide and combinations thereof.

14. The adsorption powder according to claim 13, comprising from about 35 to about 38 weight percent of the carbon-based powder, from about 52 to about 62 weight percent of calcium hydroxide, and from about 5 to about 10 weight percent of potassium iodide, and from about 5 to about 10 weight percent of cupric chloride, based on 100 total weight percent of the adsorption powder.

15. The adsorption powder according to claim 14, wherein the metals are selected from the group consisting of mercury, lead, nickel, zinc, copper, arsenic, cadmium and combinations thereof.

16. The adsorption powder according to claim 14, wherein the organic compounds selected from the group consisting of furans and dioxins.

17. An adsorption powder suitable for removing metals and organic compounds from a gaseous stream, wherein the adsorption powder, comprises a carbon-based powder selected from coal carbons, wood carbon, graphite carbon, activated carbon, coconut shell carbon, peat carbons, petroleum cokes, synthetic polymers, and combinations thereof, from about 3 to about 10 weight percent of cupric chloride, and, optionally, a component selected from calcium hydroxide, sulfur, potassium permanganate, potassium iodide and combinations thereof.

* * * * *